Jan. 2, 1934.  E. BIANCALANA  1,942,083
REFRIGERATED MEAT GRINDER
Original Filed March 25, 1932  2 Sheets-Sheet 1
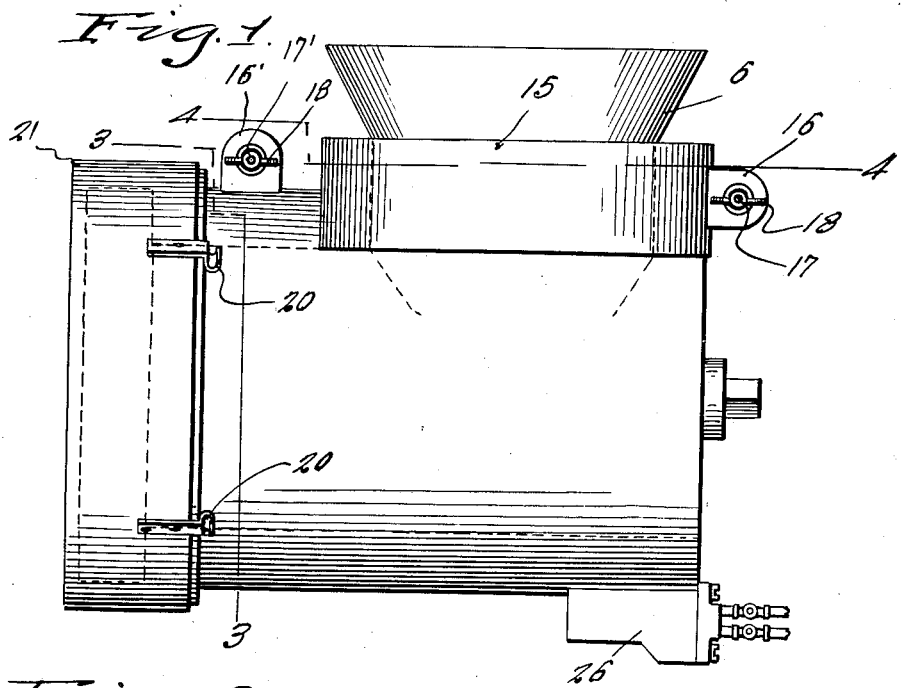
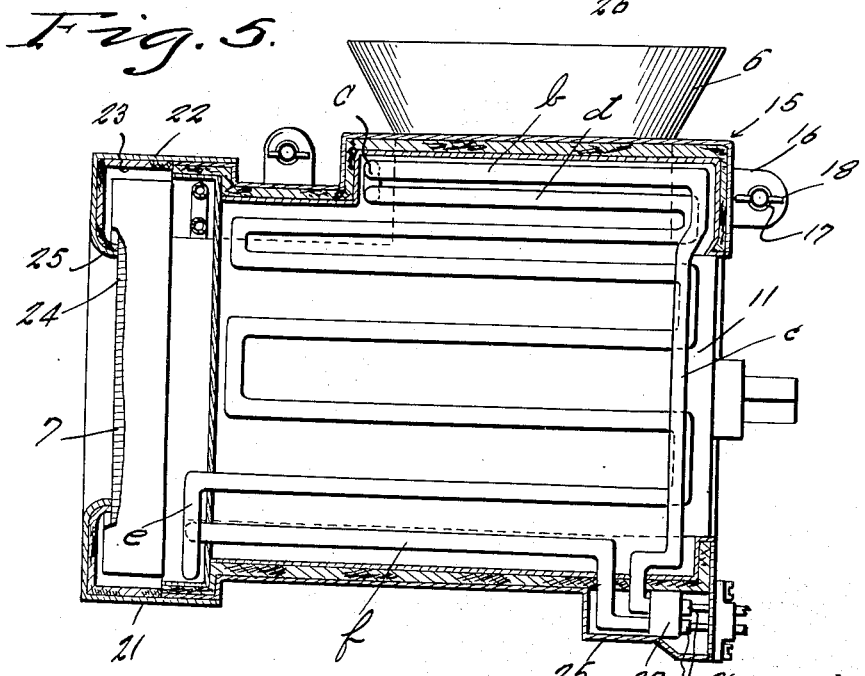
Inventor
Eugene Biancalana
By Clarence A. O'Brien
Attorney

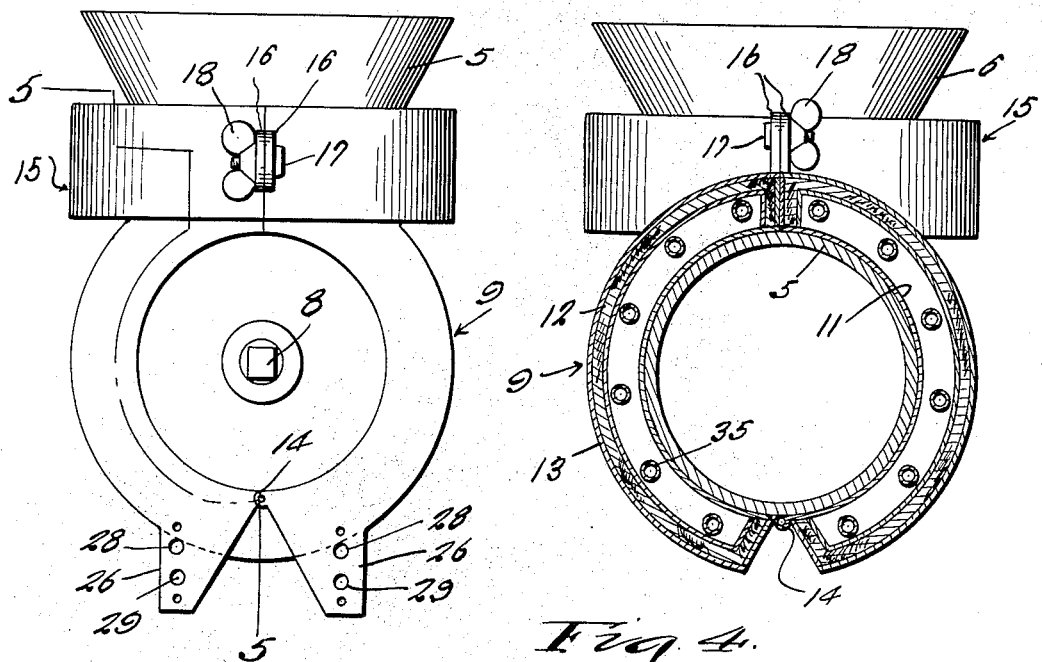
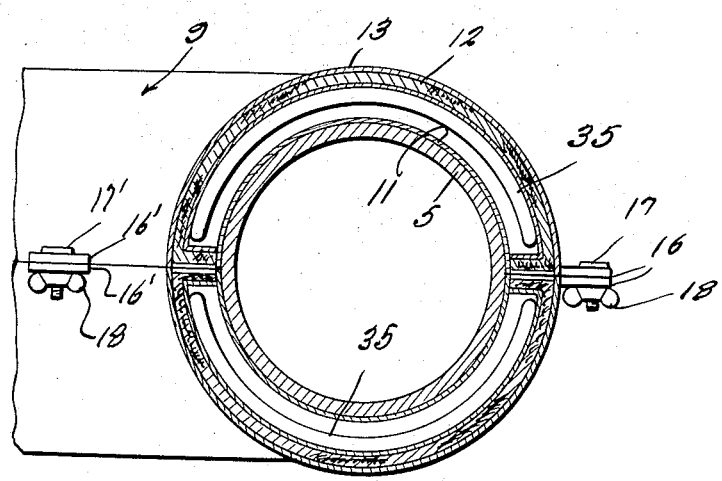

Patented Jan. 2, 1934

1,942,083

UNITED STATES PATENT OFFICE 1,942,083

REFRIGERATED MEAT GRINDER

Eugene Biancalana, Brooklyn, N. Y.

Original application March 25, 1932, Serial No. 601,229. Divided and this application November 1, 1932. Serial No. 640,724

3 Claims. (Cl. 257—212)

This invention appertains to new and useful improvements in the art of refrigerators and more particularly to a refrigerator attachment for meat grinders, the same being a division of my co-pending application, Serial No. 601,229, filed March 25, 1932 on Refrigerated meat grinders.

The principal object of this invention is to provide an attachment which can be readily applied to a meat grinder for maintaining the meat content thereof cool, especially when meat is left in the grinder for considerable periods of time.

During the course of the following specification, other important objects of the invention will become apparent to the reader.

In the drawings:—

Figure 1 represents a side elevational view of the device.

Fig. 2 represents a rear end elevational view of the device.

Fig. 3 represents a vertical sectional view taken substantially on line 3—3 of Fig. 1.

Fig. 4 represents a fragmentary horizontal sectional view taken substantially on line 4—4 of Fig. 1.

Fig. 5 represents a sectional view, taken substantially on line 5—5 of Fig. 2.

Referring to the drawings wherein like numerals designate like parts, it can be seen in Fig. 3, that numeral 5 represents the meat grinder shell which is substantially cylindrical in shape, and which as is clearly shown in Figs. 1, 2 and 3, has a hopper 6 connected thereto so that meat can be fed to the interior of the shell.

The refrigerating attachment consists of a pair of hingedly connected sections 9—9, each section consisting of a semi-cylindrical-shaped drum 11, the same having inner and outer walls of semi-cylindrical shape, and of very fine sheet metal gauge.

Disposed over the outside of each of these sections 9 and 10, and over the end portions thereof, is a heat insulating jacket 12, covered by a jacket 13 of some suitable metal or the like to protect the insulating material.

The sections 9—10 are hingedly connected together at their portions and as at 14, while each of the sections at its upper portion is provided with a semicircular formation generally referred to by numeral 15. When these semi-circular structures are brought together, they form a collar circumscribing the throat portion of the hopper 6, the same being provided with ears 16 through which a screw 17 can be disposed and equipped with a nut 18, whereby the sections 15 can be clamped together, against the throat portion of the hopper 6.

Similar ears, screws and nuts are provided on the sections 9 and 10 as denoted by character references 16', 17' and 18' respectively.

As is clearly shown in Fig. 5, the forward end portions of the sections 9—10 are offset outwardly as at 19 and over the shoulders 19 are engageable the spring retainers 20 protruding from the cap structure 21 which is engageable over the front end of the refrigerating means, the same consisting of the outside shell 22, and the inside insulating packing 23. The intermediate portion of the cap is open as at 24, and rests against the perforated plate 7 of the meat grinder as at 25. As is clearly shown in Fig. 2, each section 9—9 is provided at its lower portion with a box-like structure 26 provided with a pair of openings 29—29. In each of the box-like structures 26 is a support 30 for supporting a pair of valve shells 31. As is clearly shown in Fig. 5, a conduit 35 extends vertically in the corresponding drum 11 as at $a$ until it reaches the top of the drum where it is formed arcuately as at $b$ in a horizontal direction to follow the contour of the collar sections 15.

From the point $b$ this conduit extends downwardly a short distance and then backwardly as at $d$. The conduit then follows a course backwardly and protrudes forwardly as at $e$ before returning as at $f$ to connect to the remaining valve shell 31 in the corresponding box-like structure 26.

The foregoing arrangement of the refrigerant conduit is provided in each of the sections 9—10. Obviously, meat can be maintained in the grinder with this novel refrigerating unit attachment thereon without the likelihood of the meat spoiling in warm weather. This also eliminates the practice of keeping the grinder in a large refrigerator so as to protect the contents thereof, the old practice requiring removal of the meat grinder from the refrigerator each time an order is given.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A cooling attachment for meat grinders comprising a pair of hingedly connected sections, means for clamping the sections against the grinder, said sections being hollow, and refrigerating means therein.

2. A cooling attachment for meat grinders comprising a pair of hingedly connected sections, means for clamping the sections against a grinder, said sections being hollow, refrigerating means therein, and temperature insulating means on the outside of the said sections.

3. A cooling attachment for meat grinders comprising a jacket of hollow construction, temperature changing means in the said jacket, an insulatory lining for the said jacket, said jacket being divided into a pair of separable sections whereby it can be applied or removed with respect to a meat grinder.

EUGENE BIANCALANA.